(12) United States Patent
Gunther

(10) Patent No.: US 7,854,605 B2
(45) Date of Patent: Dec. 21, 2010

(54) INJECTION MOULDING DEVICE COMPRISING NEEDLE VALVE NOZZLES IN A BACK-TO-BACK ARRANGEMENT

(75) Inventor: Herbert Gunther, Allendorf/Eder (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 70 days.

(21) Appl. No.: 12/311,556

(22) PCT Filed: Aug. 18, 2007

(86) PCT No.: PCT/EP2007/007316

§ 371 (c)(1),
(2), (4) Date: Apr. 3, 2009

(87) PCT Pub. No.: WO2008/040415

PCT Pub. Date: Apr. 10, 2008

(65) Prior Publication Data

US 2009/0280209 A1    Nov. 12, 2009

(30) Foreign Application Priority Data

Oct. 4, 2006   (DE) .................. 20 2006 015 283 U

(51) Int. Cl.
*B29C 45/23* (2006.01)
(52) U.S. Cl. ..................... 425/564; 425/572
(58) Field of Classification Search ................. 425/564, 425/566, 572
See application file for complete search history.

(56) References Cited

U.S. PATENT DOCUMENTS 7,025,586 B2 *  4/2006  Fischer et al. ................ 425/564
7,121,820 B2 *  10/2006  Tooman et al. .............. 425/566

FOREIGN PATENT DOCUMENTS

| EP | 0 374 353 | 6/1990 |
| EP | 0 893 226 | 1/1999 |
| EP | 1 184 152 | 3/2002 |
| FR | 2 294 041 | 7/1976 |
| NL | 1017239 | 7/2002 |

\* cited by examiner

*Primary Examiner*—Tim Heitbrink
(74) *Attorney, Agent, or Firm*—Clark & Brody

(57) ABSTRACT

The present invention relates to injection molding apparatus (10) comprising a main manifold plate (16) fitted with at least several flow ducts (18), further at least two auxiliary manifold plates (22) fitted with several flow ducts (24), said auxiliary manifold plates being configured above and underneath the main manifold plate (16), the flow ducts (24) of the particular auxiliary manifold plates (22) fluidly communicating with those of the main manifold plate (16), further with needle valve nozzles (26) configured in mutually opposite and back-to-back manner and fluidly communicating with the flow ducts (24) of the auxiliary manifold plates (22), where the needle valve nozzles (26) each comprise one valve needle (28) to open/close a nozzle outlet aperture, and further pneumatically or hydraulically actuated plunger units (units (30; 71) driving the valve needles (28), said plunger units being received in at least one separate receiving plate (32; 70) configured between the auxiliary manifold plates (22), and further means cooling and/or thermally insulating the minimum of one receiving plate (32; 70).

22 Claims, 3 Drawing Sheets

INJECTION MOULDING DEVICE COMPRISING NEEDLE VALVE NOZZLES IN A BACK-TO-BACK ARRANGEMENT

FIELD OF THE INVENTION

The present invention relates to injection molding apparatus fitted with back-to-back needle valve nozzles.

BACKGROUND

When injection-molding parts, injection molding apparatus fitted back-to-back needle valve nozzles is used to feed a flowable material at a predetermined temperature and at high pressure to a plurality of separable mold inserts. The material to be processed is fed by a central fluid intake to a typically centrally configured main manifold plate. From there the material to be processed moves—optionally using one or several auxiliary manifold plates—into the valve needle nozzles injecting said material into the mold inserts. A system of flow ducts issuing into the needle valve nozzles is contained within the manifold plates. Said valve nozzles are fitted with valve needles that are driven pneumatically, hydraulically or electrically and periodically opening the gate apertures in the mold insert. This design enables accurate material metering and clean cutoff sites, in particular at high-speed operation. Where called for, the flowable material also may be injected in segmented manner, for instance in gate cascading.

Such a back-to-back injection molding apparatus is disclosed for instant the European patent document EP 1 184 152 A1. It comprises a main manifold plate which is fitted with several flow ducts and which receives the fluid to be processed from a central fluid intake. Then the fluid is moved through the main manifold plate's flow ducts to a plurality of needle valve nozzles received in nozzle receiving plates configured on each side of the main manifold plate. The needle valve nozzles of one of the nozzle receiving plate and those of the other nozzle receiving plate are configured oppositely each other in a back-to-back geometry. Sets of needle valve nozzles are combined into needle valve nozzle regions, each region being synchronously driven by a drive system. Each drive system comprises at least one adjustment drive mounted in one of the valve plates and a connecting element, the latter being driven by said adjustment drive and being connected with all valve needles of said nozzles of the corresponding region in order to thereby synchronously transmit the motion of the adjustment drive to all valve needles of one region.

The EP 1 184 152 A1 document incurs the substantive drawback that the drive systems' adjustment drives are configured in the nozzle plates that are exposed to substantial heating during injection molding, potentially entailing operational malfunctions. In particular when hydraulic or pneumatic adjustment drives are used, said high heats/temperatures may entail problems in sealing and in plunger guidance. Reliable injection molding is not assured. Moreover the individual valve needles cannot be driven individually, as is required/desirable in many applications.

The European patent document EP 0 893 226 A1 describes injection molding apparatus also comprising a central manifold plate fitted with several flow ducts. The flow ducts are fluidly connected to needle valve nozzles configured opposite each other in a back-to-back array. Each of said nozzles is fitted with a valve needle to open/close a nozzle aperture, all valve needles being driven independently for one another by pneumatically operating plunger units. The plungers units are configured in the manifold plate. While this feature allows significant injection molding apparatus compactness, on the other hand this design also incurs the drawbacks of the hot manifold plate during injection molding leading to sealing losses and to guidance problems in the plunger units.

In the light of the above stated art, one goal of the present invention is to offer an improved injection molding apparatus fitted with back-to-back valve needle nozzles, in particular offering compactness and manufacturing economy, extensively averting sealing problems and plunger-unit related difficulties affecting plunger guidance.

SUMMARY OF THE INVENTION

Said goal is attained in the present invention by the injection molding apparatus defined in claim 1. Embodiment modes are claimed in claims 2 through 21.

The present invention creates injection molding apparatus comprising at least one main manifold plate fitted with several flow ducts and at least two auxiliary manifold plates fitted with several flow ducts, the auxiliary manifold plates' flow ducts being fluidly connected with those of the main manifold plate. Moreover there is a minimum of two needle valve nozzles configured mutually opposite in a back-to-back array and fluidly communicating with the auxiliary manifold plates' flow ducts, each needle valve nozzle being fitted with one valve needle and at least one drive unit acting on the valve needles. Said drive unit is configured in at least one separate receiving plate.

Such configuration allows designing extremely compact and densely packed injection molding apparatus of which all needle valve nozzles are mounted in a back-to-back array. The feature of the separate drive units' receiving plate precludes said units from being heated by the main and/or the auxiliary manifold plates. Accordingly all drive units are thermally insulated from the manifold plates, assuring permanently reliable operation of both the drive units and the entire apparatus.

The receiving plate preferably is fitted with cooling means to reliably and durably avert heating said receiving plate, and hence the drive units in it, during injection molding apparatus operation. This feature precludes temperature-induced problems in sealing and in plunger guidance during injection molding apparatus operation. preclude overheating the receiving plate and hence those in the associated drive units where pneumatic or hydraulic drives are used, electrical drives also being applicable and problem-free. All drives will operate reliably.

In an advantageous design feature, the cooling means are in the form of cooling ducts present in the receiving plate. As a result, a cooling medium may be guided through said ducts during operation of the injection molding apparatus. Said ducts can be made simply and economically for instance in the form of boreholes that are fitted sideways into the receiving plate. Obviously too, other coolants or thermal insulating substances may be used where appropriate to keep the temperature of the receiving plate and/or of the drive units configured therein at a desired, non-critical level.

To further decrease the sensitivity of the manifold plates to temperature, the receiving plate is thermally insulated from the auxiliary manifold plates and/or the main manifold plate, preferably by an air gap subtended between the receiving plate and the auxiliary respectively the main manifold plate(s).

An especially densely packed and compact design of the injection molding apparatus is attained by configuring the drive units' receiving plate between the auxiliary manifold plates and/or in the plane of the main manifold plate.

Appropriately the present invention uses at least two drive units configured as a drive-pair in a back-to-back array within the receiving plate. In this way each needle valve nozzle may be fitted with its own drive, both parts being mounted in extremely densely packed manner in the receiving plate. The valve needles also may be driven synchronously or individually, such arrangements opening a plurality of applicabilities to the injection molding apparatus.

In a further advantageous embodiment mode of the present invention of its injection molding apparatus, the receiving plate is constituted by two partial plates, and hence is split, such a feature facilitating its manufacture. Furthermore said feature allows economically, quickly and easily assembling/disassembling the needle valve nozzles.

Preferably each partial plate receives one drive unit of such a pair of drives, the partial plates receiving the drive units each from the side of the mutually facing partial plate surfaces. For that purpose the partial plates are fitted at their mutually facing surfaces with boreholes receiving the drive units. Again this feature simplifies the entire structure and facilitates assembly. The mutually facing partial plate surfaces are sealed from each other by at least one seal.

In another significant embodiment mode of the present invention, the receiving plate is fitted at its surfaces pointing away from each other with blind holes receiving the drive units. Preferably but not mandatorily this receiving plate is integral. In this way also, the drive units may be easily and rapidly mounted/dismantled, whereby handling of the injection molding apparatus as a whole is simplified.

The drive unit may be in the form of pneumatic, hydraulic or electric drives providing versatile applicabilities. Illustratively the drive units are designed in a manner that the valve needles are synchronously moved thereby. However, as needed/desired, each valve needle also may be driven individually.

In the light of the present invention, the pneumatic or hydraulic drive units are fitted with plungers received in the boreholes of the receiving plate respectively of the partial plates. Each plunger is held by an affixing or securing element in its borehole, such a design feature being easily and economically implemented, but also assuring simple handling. Preferably said affixing or securing element is a round clip. Appropriately said clip constitutes a stop for the plunger received in the borehole.

In another alternative the affixing or securing element is a lid at least partly closing the said borehole. This lid also secures the drive unit in the receiving plate respectively in the partial plates and illustratively is exchangeable for maintenance at any time.

The position of each valve needle is axially adjustable using spacers, in particular shims. This feature assures that the valve needle on one hand shall be fixed in place regarding the plunger's direction of displacement and on the other hand it shall assume the proper position within the injection molding apparatus. Such shims allow compensating various thermal expansions up to about 0.5 mm.

BRIEF DESCRIPTION OF THE DRAWINGS

Further features, particulars and advantages of the present invention are defined in the claims and in the following description of embodiments and in relation to the appended drawings.

DESCRIPTION OF THE PREFERRED EMBODIMENTS

Figure 1:
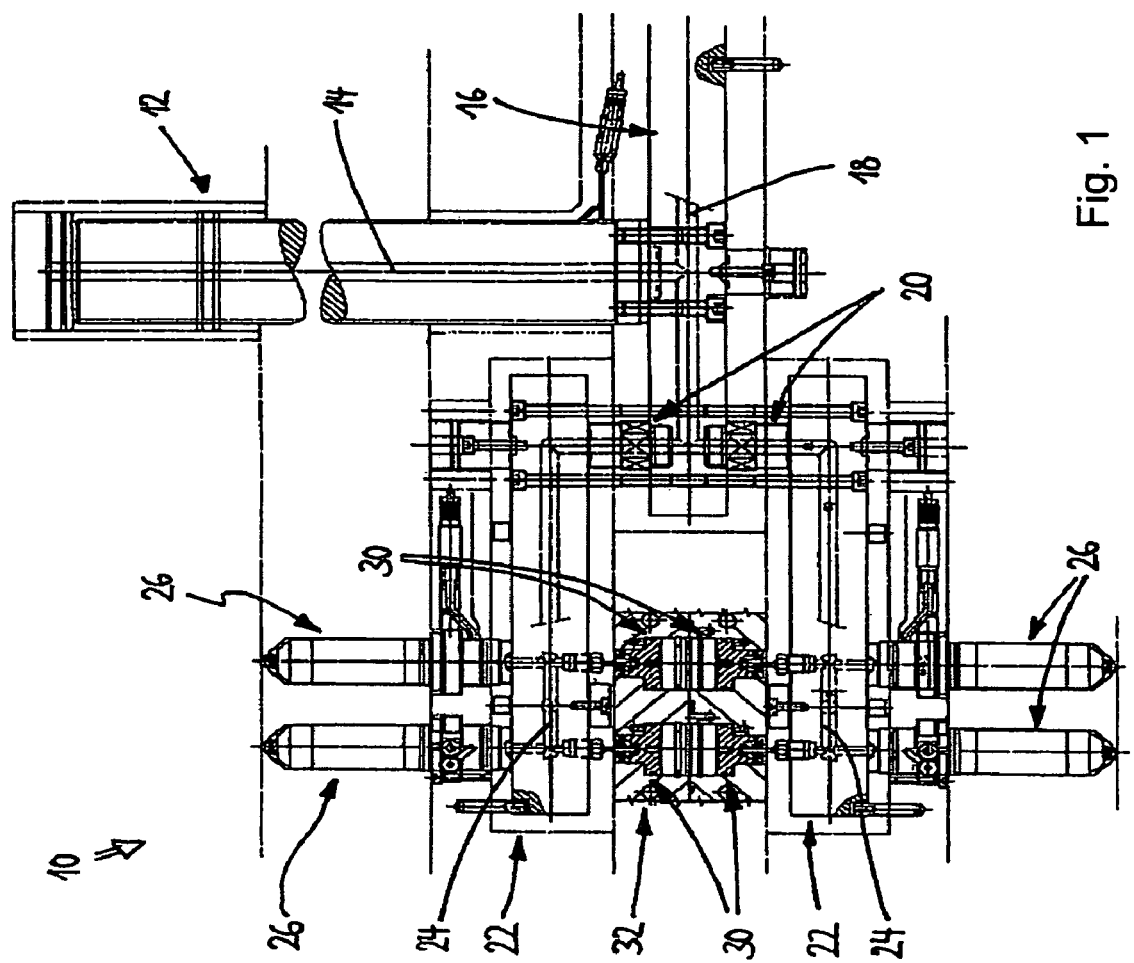
FIG. 1 is a partial cross-section of injection molding apparatus of the invention.

FIG. 1 is a partial cross-section of a first embodiment mode of injection molding apparatus 10 of the invention. Said apparatus comprises a fluid intake pipe stub 12 fitted with a central borehole 14 feeding the material to be processed, for instance a melt of plastic, to a main manifold plate 16 during the injection molding apparatus' operation. The main manifold plate 16 is fitted with flow ducts 18 guiding the fluid through connecting elements 20 to auxiliary manifold plates 22 situated above and below the main manifold plate 16.

Inside the auxiliary manifold plates 22, the fluid moves through flow ducts 24 in these plates to needle valve nozzles 26 and is injected from said nozzles at nozzle outlet apertures (not shown in further detail) into omitted mold cavities. Said cavities are subtended in separable (and also omitted) mold nesting plates situated above and below the auxiliary manifold plates 22 and consequently are configured substantially in tiers.

FIG. 1 also shows that the needle valve nozzles 26 assembled to the auxiliary manifold plates 22 run outwards, every two needle valve nozzles being positioned pair-wise in a back-to-back array and aligned with one another and pointing in opposite directions.

To selectively open/close the nozzle outlet aperture, each needle valve nozzle 26 is fitted with a valve needle 28 driven by an associated, pneumatically operated plunger unit 30. The plunger units 30 are mounted in a separate receiving plate 32 which in the present instance is situated between the auxiliary manifold plates 22 and at a distance from the main manifold plate 16, the receiving plate 32 being situated in the plane of the main manifold plate 16. As a result the overall structure's height is minute, and consequently the entire injection molding apparatus is very compact.

Figure 2:
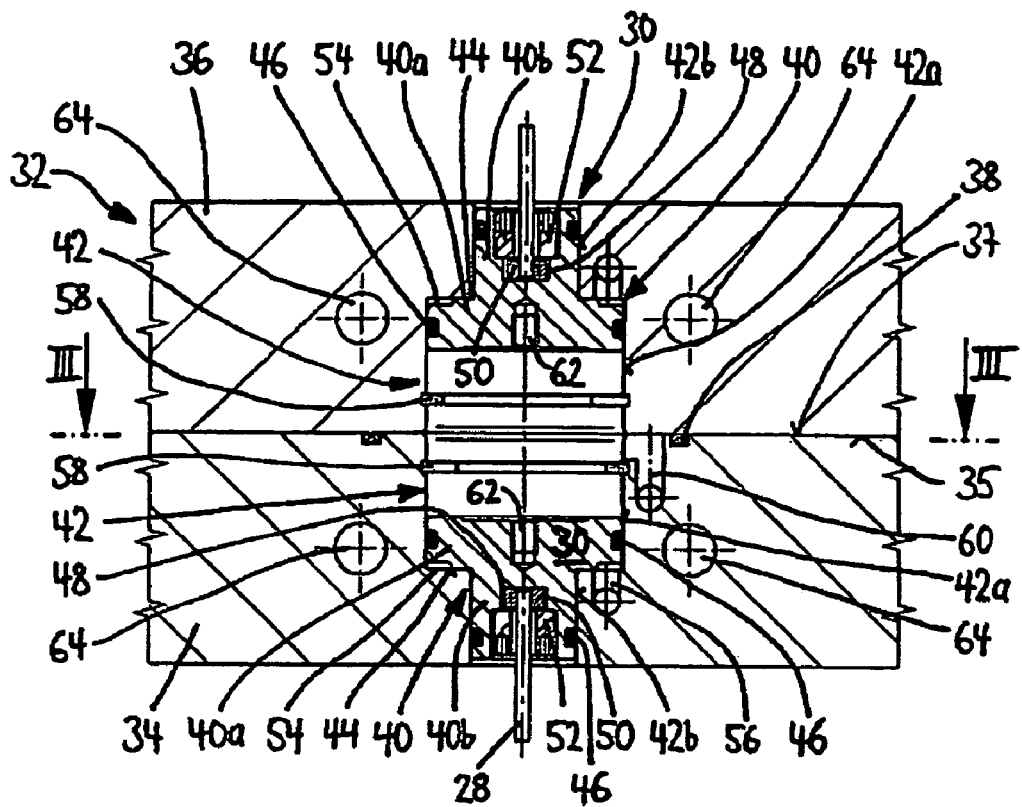
FIG. 2 is an enlarged cross-sectional elevation of a receiving plate of the injection molding apparatus of FIG. 1.

FIG. 2 shows an enlarged view of the receiving plate 32 of FIG. 1 together with the plunger units 30 configured in said plate.

Figure 3:
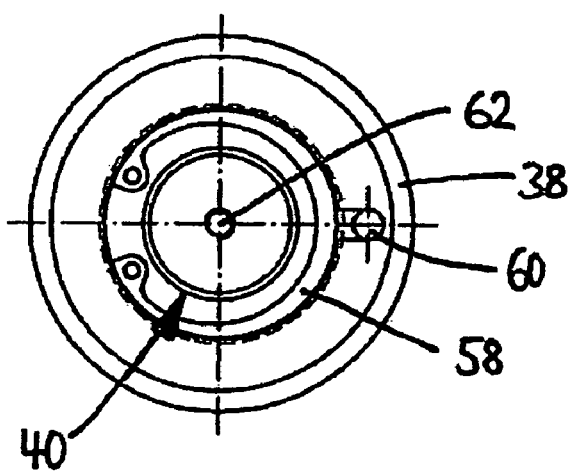
FIG. 3 is a cross-sectional elevation along line III-III of FIG. 2.

The receiving plate 32 is in two parts, the two partial plates 34 and 36 being sealed from each other at their mutually facing surfaces 35, 37 by a seal 38 in the region of the plunger units 30. A borehole 42 is fitted into each partial plate 34, 36 and receives a plunger 40 of the plunger unit 30, each borehole 42 comprising a borehole 42a of relatively larger diameter and a segment 42b of a relatively smaller diameter, an annular offset 44 being subtended between said segments. Commensurately with the borehole segments 42a and 42b the plunger 40 is also fitted with a segment 40a of larger diameter and a segment 40b of smaller diameter, said larger-diameter segment 40a of the plunger 40—in the closed position of the valve needle 28 and as indicated in FIGS. 1 and 2—by its end face resting against the annular offset 44 which accordingly acts as a stop. Each plunger is secured by means of a securing element 58 in its borehole 42 (FIG. 3). Illustratively said securing element is a snap ring respectively a circlip simultaneously acting as a stop for the plunger 40.

To set an optimal ratio of glide to friction between the plunger 40 and the borehole 42, the receiving borehole's surfaces either are rolled or honed. The seals 46 seal the plunger 38 from the surfaces of the borehole 40.

Each plunger 40 is fitted at its end face with a further recess 48 receiving the head 50 of the associated valve needle 28. An annular affixing bush 52 affixes the valve needle 28 in the plunger 40, pressing the head 50 of the said needle against the terminal face subtended by the recess 48. Omitted spacer elements may be inserted as needed between the affixing bush 52 and the head 50 of the valve needle 28, respectively between the head 50 and the terminal face of the recess 48, to adjust the axial position of said valve needle 28, said spacer elements each being illustratively 0.1 mm thick. These spacer elements allow compensating differentials of thermal expansions up to about 0.5 mm.

To enable the plungers 40 moving out of the closed valve needle positions shown in FIGS. 1 and 2 into the corresponding open positions, an annular recess 54 is constituted in each case at the terminal faces—pointing toward the annular offset 44 of the borehole 42—of the segments of larger diameter 40a of the plungers 40, in each case one of the compressed air ducts 56 constituted in the receiving plate 32 issuing into said recess 54. When the plungers 40 are loaded through the said compressed air ducts 56 with compressed air, they shall be correspondingly displaced toward each other until assuming their respective terminal positions defined by the circlips 58 acting as stops. In order that the plungers 40 then might again be displaceable into the closed needle positions shown in FIGS. 1 and 2, a further compressed air duct 60—constituted in the partial plate 34 of the receiving plate 32—issues into borehole segment situated between the said Seeger clips 58. In the embodiment mode of the injection molding apparatus 10 of the present invention shown in FIGS. 1 and 2, the plungers 40 of the plunger units 30 driving the mutually opposite valve needles 28 therefore are displaced synchronously.

Cooling ducts 64 are fitted into the partial plates 34 and 36 of the receiving plate 32 to cool the plunger units 30 and, during injection molding apparatus operation, shall pass a cooling medium. Thermally caused problems in sealing and plunger guidance are precluded by cooling the plunger units 30.

Because the receiving plate 32 is divided into the two partial plates 34, the valve needles 28 are easily replaced. In this procedure the partial plates 34 initially are separated from each other using compressed air, then each plunger 40 together with the valve needle 28 is pulled by an extraction winch 62 out of the pertinent borehole 42, the affixing bush 52 is removed and lastly the valve needle 28 is extracted. Thereupon a new valve needle 28 can be affixed to the plunger 40, the axial position of said needle being adjustable, as already discussed above, by positioning corresponding spacer elements.

Figure 4:
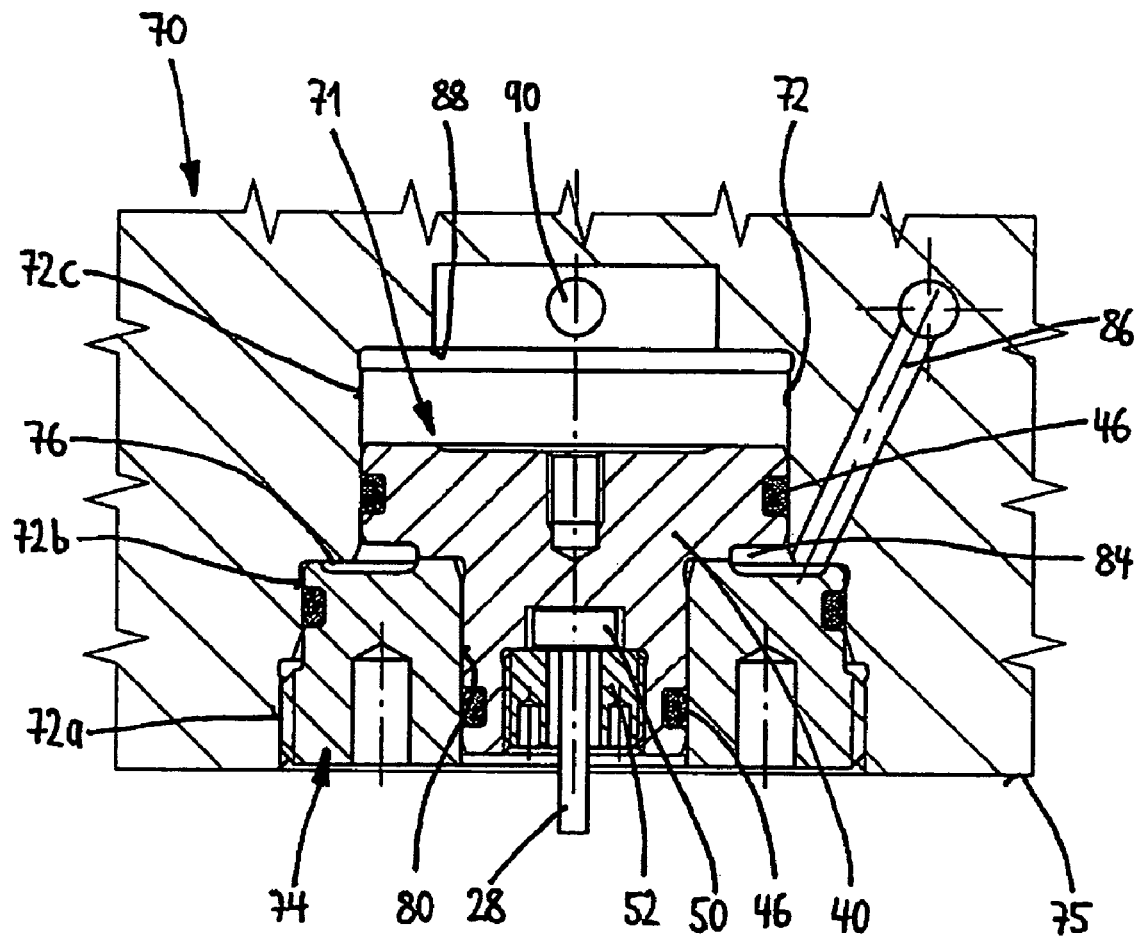
FIG. 4 is a partial cross-sectional elevation of a receiving plate of another embodiment mode of the injection molding apparatus of the invention.

FIG. 4 shows a partial, cross-sectional view of a receiving plate 70 of an alternative embodiment mode of the injection molding apparatus of the present invention. In this embodiment mode, the receiving plate 70 preferably shall be integral. In order to receive the plunger 40 of the plunger unit 71—which widely is of the same design as the plunger of the previously discussed embodiment mode, the receiving plate 70 of this second embodiment mode preferably is integral. The receiving plate 70 is fitted at its mutually opposite external surfaces 75 with one borehole 72 comprising a segment 72a of larger diameter, a segment 72b of middle diameter and a segment 72c of smaller diameter. The segment 40c of a lesser diameter of the plunger 40 is received in the segment 72a of larger diameter.

To preclude the plunger 40 from falling out of the borehole 72, again each plunger 40 is secured by an affixing respectively a securing element 74 in said borehole. Preferably the affixing element 74 is an annular lid at least partly covering the borehole 72 into which it is screwed. The external contour of the lid 74 corresponds to the segment 72b of middle diameter and to the segment 72 of larger diameter of the borehole 72, the terminal face of the affixing element 74 pointing to the inside of the borehole 72 resting against the annular offset 76 constituted between the segment of lesser diameter 72c and the segment of middle diameter 72b of the borehole 72. The segment 40b with a lesser diameter of the borehole 72 is held in the cylinder surface 80 defining the inside surface of the affixing element 74. The surface of the segment 72c of a smaller diameter of the borehole 72 and the cylinder surface 80 of the affixing element 74 are rolled or honed to attain an optimal glide/friction ratio. The plunger 40 is sealed by seals 46 relative to the segment 72c of smaller diameter of the borehole 72 and of the cylinder surface 80 of the affixing element 74. Moreover the affixing element 74 is sealed by a seal 82 relative to the segment 72b of middle diameter of the borehole 72.

To allow the plunger 40 moving upward, out of its position shown in FIG. 4 wherein the valve needles 28 assume their closed positions, the terminal face of the affixing element 74 facing said plunger is fitted with an annular groove 84 into which issues a compressed air duct 86 in the receiving plate 70. When compressed air is applied through the compressed air duct 86 and the annular groove 84 to the plunger 40, said plunger shall be forced upward until coming to rest against the end surface 88 of the borehole 72. A further compressed air duct 90 issues into the end surface 88 to move the plunger 40 out of the just above discussed position downward again into the position shown in FIG. 4. When compressed air is applied through the compressed air duct 90 to the plunger 40, same is correspondingly forced downward.

When exchanging the valve needle 28, first the lid 74 is unscrewed from the borehole 72, whereupon said plunger can be pulled out of it. Then the affixing bush 52 can be removed from the plunger 40 and the valve needle 28 then may be extracted.

Also the receiving plate 70 is fitted with appropriate cooling ducts—omitted from FIG. 4—to cool the plunger unit 30.

Illustratively the embodiment mode of the receiving plate 70 shown in FIG. 4 shall be preferred when each valve needle 28 shall be driven independently from the other valve needles 28.

The present invention is not restricted to one of the above embodiment modes, instead it may modified in versatile manner. Illustratively and depending on the particular application of the injection molding apparatus, the drive units may be designed also as hydraulic or electric drives. Also the receiving plate 70 of the embodiment mode of FIG. 4 may be divided into two partial plates, each partial plate being fitted with corresponding boreholes 72 receiving the drive units 30 configured pairwise mutually in a back-to-back array.

One should however keep in mind that the present invention creates injection molding apparatus 10 comprising at least one main manifold plate 16 fitted with several flow ducts 18, said plate preferably being configured centrally, and that, during operation of the apparatus 10, the material being processed is fed to said apparatus through at least one fluid intake 12. Furthermore the injection molding apparatus 10 comprises at least two auxiliary manifold plates 22 each fitted with several flow ducts 24 and mounted above and underneath the main manifold plate 16, the flow ducts 24 of the particular auxiliary manifold plates 22 fluidly communicating with those of the main manifold plate 16.

Also needle valve nozzles 26 are used which are configured in mutually opposite back-to-back arrays and fluidly communicate with the flow ducts 24 of the auxiliary manifold plates 22. The needle valve nozzles 26 each are fitted with one valve needle 28 opening and closing a nozzle outlet aperture injecting the material to be processed.

Pneumatically, hydraulically or electrically operated drive units 30 are used to drive the valve needles 28. Said units illustratively are plunger units. They are received in the present invention in at least one separate receiving plate 30, 70 configured between the auxiliary manifold plates 22. Moreover the present invention provides means 64 for cooling purposes and/or to thermally insulate the minimum of one receiving plate 30, 70. This design reliably prevents heating the receiving plate 30, 70—and thereby heating the plunger units 30 which are configured in said plate—during operation of the injection molding apparatus 10 while reliably averting thereby the afore-mentioned temperature-related sealing and guidance problems of the plunger units 30.

For such purposes preferably cooling ducts 64 are fitted into the minimum of one receiving plate 30, 70 to pass a cooling medium during operation of the injection molding apparatus 10. It is understood that other coolants or thermally insulating substances may be used for such purposes, provided they be appropriate to maintain the temperature of the minimum of one receiving plate and of the plunger units mounted on said plate at a desired, non-critical level. Illustratively a heat-transferring air gap for may be subtended between the receiving plate 30, 70 and the auxiliary manifold plates 22 to thermally insulate said plate.

All features and advantages implicit or explicit in the claims, specification and drawings, inclusive design details, spatial configurations and procedural steps, may be construed being inventive per se or in arbitrary combinations.

LIST OF REFERENCES

| | |
|---|---|
| 10 | injection molding apparatus |
| 12 | fluid intake pipe stub |
| 14 | borehole |
| 16 | main manifold plate |
| 18 | flow duct |
| 20 | connector element |
| 22 | auxiliary manifold plate |
| 24 | flow duct |
| 26 | needle valve nozzle |
| 28 | valve needle |
| 30 | drive unit |
| 32 | receiving plate |
| 34 | partial plate |
| 35 | surface |
| 36 | partial plate |
| 37 | surface |
| 38 | seal |
| 40 | plunger |
| 40a | large diameter plunger segment |
| 40b | small diameter plunger segment |
| 42 | borehole |
| 42a | large-diameter borehole segment |
| 42b | small-diameter borehole segment |
| 44 | annular offset |
| 46 | seal |
| 48 | recess |
| 50 | head |
| 52 | affixing bush |
| 54 | annular recess |
| 56 | compressed air duct |
| 58 | snap-ring/circlip |
| 60 | compressed air duct |
| 62 | extraction thread |
| 64 | cooling duct |
| 70 | receiving plate |
| 71 | plunger unit |
| 72 | borehole |

-continued

LIST OF REFERENCES

| | |
|---|---|
| 72a | large diameter borehole segment |
| 72b | middle diameter borehole segment |
| 72c | small diameter borehole segment |
| 74 | affixing element |
| 75 | surface |
| 76 | offset |
| 77 | offset |
| 80 | cylinder surface |
| 82 | seal |
| 84 | groove |
| 86 | compressed-air duct |
| 88 | terminal face |
| 90 | compressed-air duct |

The invention claimed is:

1. Injection molding equipment (10) comprising:
at least one main manifold plate (16) fitted with several flow ducts (18), said at least one main manifold plate connected to auxiliary manifold plates, said auxiliary manifold plates having flow ducts fluidly communicating with those of the main manifold plate (16),
at least two needle valve nozzles (28) configured mutually opposite in a back-to-back array and fluidly communicating with the flow ducts (24) of the auxiliary manifold plates (22), each needle valve nozzle (26) being fitted with one valve needle (28),
at least one drive unit (30, 71) operating the valve needles (28), and
at least one separate receiving plate (32; 70) receiving the drive unit (30; 71).

2. Injection molding apparatus as claimed in claim 1, characterized in that the receiving plate (32; 70) is fitted with cooling means (64).

3. Injection molding apparatus as claimed in claim 2, characterized in that the cooling means (64) are cooling ducts fitted into the receiving plate (32; 70).

4. Injection molding apparatus as claimed in claim 1, characterized in that the receiving plate (32; 70) is thermally insulated relative to the auxiliary manifold plates (22) and/or to the main manifold plate (16).

5. Injection molding apparatus as claimed in claim 4, characterized in that an air gap is subtended between the receiving plate (32; 70) and the auxiliary manifold plates (22) respectively the main manifold plate (16).

6. Injection molding apparatus as claimed in claim 1, characterized in that the receiving plate (32; 70) is configured between the auxiliary manifold plates (22).

7. Injection molding apparatus as claimed in claim 1, characterized in that the receiving plate (32; 70) is situated in the plane of the main manifold plane (16).

8. Injection molding apparatus as claimed in claim 1, characterized in that said injection molding apparatus comprises at least two drive units (30; 71) configured as drive pairs in a back-to-back array within the receiving plate (32; 70).

9. Injection molding apparatus as claimed in claim 1, characterized in that the receiving plate (32; 70) is constituted by two partial plates (34; 36).

10. Injection molding apparatus as claimed in claim 9, characterized in that each partial plate (34; 36) receives one drive unit (30; 71) of a drive pair.

11. Injection molding apparatus as claimed in claim 9, characterized in that the partial plates (34; 36) receive the drive units (30) each from the side of the mutually facing surfaces (35; 37) of said partial plates.

12. Injection molding apparatus as claimed in claim 11, characterized in that the partial plates (34; 36) are fitted at their mutually facing surfaces (35; 37) with boreholes (42) receiving the drive units (30).

13. Injection molding apparatus as claimed in claim 9, characterized in that the mutually facing surfaces (35; 37) of the partial plates (34, 36) are sealed from each other by at least one seal (38).

14. Injection molding apparatus as claimed in claim 1, characterized in that the receiving plate (32; 70) is fitted at its surfaces (75; 77) pointing away from each other with blind holes (72) receiving the drive units (71).

15. Injection molding apparatus as claimed in claim 1, characterized in that the drive units (30; 71) are pneumatic, hydraulic or electric drive units.)

16. Injection molding apparatus as claimed in claim 1, characterized in that the drive units (30; 71) are designed in a manner they synchronously displace the valve needles (28) they drive.

17. Injection molding apparatus as claimed in claim 15, characterized in that the pneumatic or hydraulic drive units (30; 71) are fitted with plungers (42; 72) received in the boreholes (42; 72) of the receiving plate (32; 70) respectively of the partial plates (34; 36).

18. Injection molding apparatus as claimed in claim 17, characterized in that each plunger (40) is secured in its borehole by an affixing or securing element (58; 74).

19. Injection molding apparatus as claimed in claim 18, characterized in that the affixing or securing element (58; 74) is a snap-ring/circlip.

20. Injection molding apparatus as claimed in claim 18, characterized in that the affixing or securing element (58; 74) constitutes a stop for the plunger (40) received in the borehole (42; 72).

21. Injection molding apparatus as claimed in claim 18, characterized in that the affixing or securing element (58; 74) is a lid at least partly closing the borehole (72).

22. Injection molding apparatus as claimed in claim 1, characterized in that the axial position of each valve needle (28) is adjustable.

* * * * *